United States Patent
Choi et al.

(10) Patent No.: US 11,407,845 B2
(45) Date of Patent: Aug. 9, 2022

(54) RESIDUAL MONOMER CONTENT CONTROLLING METHOD OF POLYMER

(71) Applicant: LG Chem, Ltd., Seoul (KR)

(72) Inventors: Yong Joon Choi, Daejeon (KR); Won Chan Park, Daejon (KR)

(73) Assignee: LG Chem, Ltd., Seoul (KR)

( * ) Notice: Subject to any disclaimer, the term of this patent is extended or adjusted under 35 U.S.C. 154(b) by 707 days.

(21) Appl. No.: 16/335,576

(22) PCT Filed: Sep. 22, 2017

(86) PCT No.: PCT/KR2017/010490
§ 371 (c)(1),
(2) Date: Mar. 21, 2019

(87) PCT Pub. No.: WO2018/056758
PCT Pub. Date: Mar. 29, 2018

(65) Prior Publication Data
US 2020/0017612 A1    Jan. 16, 2020

(30) Foreign Application Priority Data
Sep. 23, 2016   (KR) .................. 10-2016-0121802

(51) Int. Cl.
| | | |
|---|---|---|
| *C08F 6/00* | (2006.01) |
| *C08L 55/02* | (2006.01) |
| *F26B 3/06* | (2006.01) |
| *F26B 3/08* | (2006.01) |
| *F26B 21/06* | (2006.01) |

(52) U.S. Cl.
CPC .............. *C08F 6/005* (2013.01); *C08L 55/02* (2013.01); *F26B 3/06* (2013.01); *F26B 3/08* (2013.01); *F26B 21/06* (2013.01)

(58) Field of Classification Search
CPC .. C08F 6/005; C08F 6/001; F26B 3/06; F26B 3/08; F26B 21/06
See application file for complete search history.

(56) References Cited

U.S. PATENT DOCUMENTS

| | | |
|---|---|---|
| 3,866,332 A | 2/1975 | Hertz |
| 3,954,910 A | 5/1976 | Kropp et al. |
| 6,375,793 B1 | 4/2002 | Uchida et al. |
| (Continued) | | |

FOREIGN PATENT DOCUMENTS

| | | |
|---|---|---|
| CN | 1112938 A | 12/1995 |
| CN | 1506393 A | 6/2004 |
| (Continued) | | |

OTHER PUBLICATIONS

Alaathar, et al., "Modeling and flowsheet simulation of continuous fluidized bed dryers," Powder Technology 238 (2013) 132-141. (Year: 2013).*

(Continued)

*Primary Examiner* — Catherine S Branch
(74) *Attorney, Agent, or Firm* — Morgan, Lewis & Bockius LLP

(57) ABSTRACT

A method for controlling a residual monomer content of a polymer, wherein when a hot-air temperature and a hot-air velocity are maintained, the controlling method can predict the content of the residual monomer by controlling a hot-air mass ratio without influence of other external factors.

8 Claims, 2 Drawing Sheets

(56) References Cited

U.S. PATENT DOCUMENTS

| | | |
|---|---|---|
| 2006/0127585 A1 | 6/2006 | Himori et al. |
| 2007/0149691 A1 | 6/2007 | Ishizaki et al. |
| 2014/0046016 A1 | 2/2014 | Kang et al. |
| 2014/0094556 A1 | 4/2014 | Ahn et al. |
| 2015/0011388 A1 | 1/2015 | Matsumoto et al. |

FOREIGN PATENT DOCUMENTS

| | | |
|---|---|---|
| CN | 101942045 A | 1/2011 |
| CN | 102432905 A | 5/2012 |
| EP | 0659770 A1 | 6/1995 |
| EP | 2527391 A1 | 11/2012 |
| JP | H07224109 A | 8/1995 |
| JP | H11147911 A | 6/1999 |
| KR | 20050051940 A | 6/2005 |
| KR | 20120135036 A | 12/2012 |
| KR | 20150059340 A | 6/2015 |
| KR | 101534378 B1 | 7/2015 |
| KR | 20160054742 A | 5/2016 |
| KR | 20170045624 A | 4/2017 |

OTHER PUBLICATIONS

Extended European Search Report including the Search Opinion for Application No. EP 17853472.3 dated Aug. 26, 2019, 10 pages.

Search report from International Application No. PCT/KR2017/010490, dated Jan. 5, 2018.

Office Action for Chinese Patent Application No. 2017800587031; dated Jan. 28, 2021; 5 pages.

English translation of Office Action for Chinese Patent Application No. 2017800587031; dated Jan. 28, 2021; 2 pages.

Search Report for Chinese Patent Application No. 2017800587031; 3 pages.

* cited by examiner

RESIDUAL MONOMER CONTENT CONTROLLING METHOD OF POLYMER

CROSS-REFERENCE TO RELATED APPLICATIONS

The present application is a national phase entry under 35 U.S.C. § 371 of International Application No. PCT/KR2017/010490 filed on Sep. 22, 2017, which claims priority from Korean Patent Application No. 10-2016-0121802 filed on Sep. 23, 2016, the disclosures of which is incorporated herein by reference.

TECHNICAL FIELD

Technical Field

The present application relates to a residual monomer content controlling method of a polymer.

Background Art

Acrylonitrile butadiene styrene (ABS), which is now in mass production, is dried in a fluidized bed dryer through processes such as synthesis and dehydration and products having various moisture contents and residual monomers are produced by controlling a hot-air temperature and a hot-air velocity.

Depending on various drying conditions, final product properties such as moisture contents and residual monomer concentrations are determined, where the longer the residence time and the higher the hot-air temperature, the final product tends to show a lower residual monomer content.

However, in the process of setting drying conditions for producing a polymer having a desired level of residual monomer content, the residual monomer content is changed depending on dryer factors such as bed sizes, feed rates of polymers and superficial velocities, polymer particle characteristics and process characteristics, in addition to residence times and hit-air temperatures, whereby there is no definite quantitative index for predicting the residual monomer.

Therefore, indicators for making products having a desired level of residual monomer are required by developing drying condition factors for control of the residual monomer in the ABS particles.

PRIOR ART DOCUMENTS

Patent Documents (Patent Document 1) Korean Laid-open Patent Publication No. 2016-0054742

DISCLOSURE

Technical Problem

The present application is intended to provide an indicator for making a product having a desired level of residual monomer by developing a drying condition factor for residual monomer control.

Technical Solution

The present application relates to a residual monomer content controlling method of a polymer.

The method is a method for controlling a residual monomer content in a polymer according to a drying process using a dryer, which provides a residual monomer content controlling method of the polymer using a hot-air mass ratio factor represented by Equation 1 below.

$$A/B \qquad [\text{Equation 1}]$$

In Equation 1 above, A is a mass (Kg) of hot-air flowing into the dryer, and B is a mass (Kg) of the polymer flowing into the dryer.

Advantageous Effects

The present application relates to a method for controlling a residual monomer content in a polymer, and in the case where a hot-air temperature and a hot-air velocity are maintained, the controlling method can predict the content of the residual monomer without influence of other external factors by adjusting a hot-air mass ratio.

BEST MODE

Figure 1:
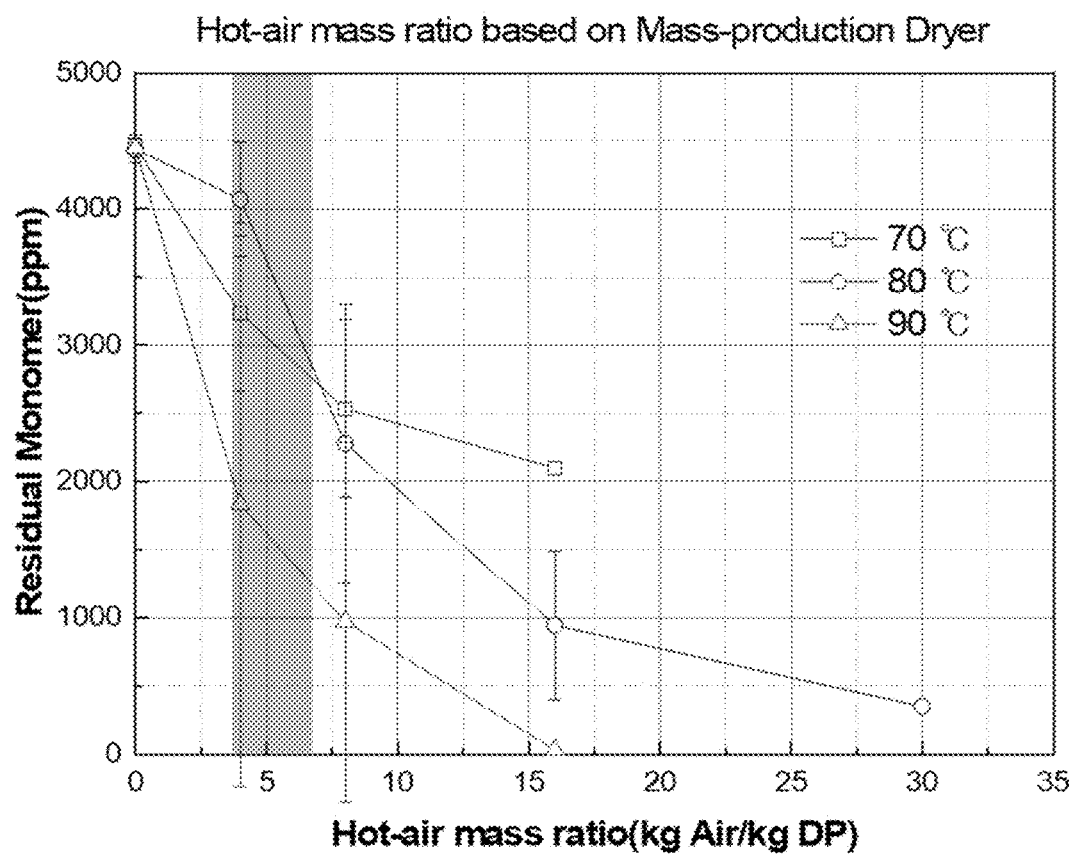
FIG. 1 is a graph showing residual monomer contents depending on hot-air mass ratios under a specific hot-air temperature condition.

The present application relates to a residual monomer content controlling method of a polymer.

In a method for preparing a polymer, the residual monomer was controlled by drying a product in a fluidized bed dryer following processes such as synthesis and dehydration.

Typically, the fluidized bed dryer is a drying machine that removes moisture while supplying hot-air to polymer particles containing moisture to move the polymer particles.

Conventionally, in order to remove the residual monomer of the polymer by using this fluidized bed dryer, the retention time was increased and the hot-air temperature was raised to lower the residual monomer content in the final product.

However, the process of controlling the residual monomer through the process of removing moisture using the fluidized bed dryer has been affected by various factors other than the hot-air temperature and the residence time. For example, factors of dryer factors such as bed sizes, polymer feed rates, hot-air flow rates and superficial velocities, polymer particle characteristics and process characteristics, and the like have affected the residual monomer content.

Hereinafter, the meanings of the factors will be described.

The retention time means a time that polymer particles containing moisture are retained while moving from an inlet of a fluidized bed dryer to an outlet thereof.

The hot-air temperature means a temperature of air flowing into a fluidized bed dryer to remove moisture from polymer particles containing moisture.

The bed size means a volume of a space capable of hot-air drying polymer particles containing moisture in a fluidized bed dryer.

The polymer feed rate means an inflow rate of polymer particles containing moisture.

The hot-air flow rate means a flow rate of air flowing into a fluidized bed dryer in order to remove moisture from polymer particles containing moisture.

The superficial velocity means an apparent velocity in which an inflow rate of polymer particles containing moisture is divided by a bed section area.

As described above, conventionally, when the residual monomer was removed through the drying process of the polymer, it was affected by various factors, and thus there were difficulties in controlling the residual monomer in the final product to a desired level.

In this regard, the present invention is intended to provide an indicator for making a product having a desired level of residual monomer by developing a drying condition factor for residual monomer control.

As one example, the present application is a method for controlling a residual monomer content in a polymer according to a drying process using a dryer, which may provide a residual monomer content controlling method of the polymer using a hot-air mass ratio factor represented by Equation 1 below.

$$A/B \qquad [\text{Equation 1}]$$

In Equation 1 above, A is a mass (Kg) of hot-air flowing into the dryer, and B is a mass (Kg) of the polymer flowing into the dryer.

Thus, by controlling the hot-air mass ratio represented by Equation 1 through the method for controlling the residual monomer content in the polymer according to the present application, it is possible to control the residual monomer content in the polymer regardless of one or more external factors selected from the group consisting of bed sizes, superficial velocities, hot-air flow rates, retention times and polymer types.

Specifically, the hot-air mass ratio factor represented by Equation 1 may mean the mass (Kg) of the hot-air flowing into the dryer relative to the mass (Kg) of the polymer flowing into the dryer.

As the hot-air mass ratio represented by Equation 1 increases, the content of the residual monomer may be decreased linearly or non-linearly.

Specifically, the increase of the hot-air mass ratio represented by Equation 1 means that the mass of the hot-air flowing into the dryer is larger than the mass of the polymer flowing into the dryer. Therefore, since a large amount of hot-air is supplied to dry a small amount of moisture-containing polymer, the content of the residual monomer in the final product may be reduced.

The content of the residual monomer may be controlled by further comprising a hot-air temperature factor.

For example, as the hot-air temperature increases under a condition that the hot-air mass ratio represented by Equation 1 is constant, it shows a tendency to decrease the content of the residual monomer.

At this time, the residual monomer content of the polymer can be controlled to 4500 ppm or less within a range of the hot-air temperature of 60 to 100° C. and the hot-air mass ratio of 2 to 10.

Also, the residual monomer content of the polymer can be controlled to 2500 ppm or less within the range of the hot-air temperature of 60 to 100° C. and the hot-air mass ratio of 10 to 20.

Furthermore, the residual monomer content of the polymer can be controlled to 1000 ppm or less within the range of the hot-air temperature of 60 to 100° C. and the hot-air mass ratio of 20 to 30.

From this, it can be seen that the residual monomer content can be predicted depending on the hot-air mass ratio under a specific temperature condition.

The content of the residual monomer may be controlled by further comprising a hot-air velocity factor.

For example, as the hot-air velocity increases under a condition that the hot-air mass ratio represented by Equation 1 and the hot-air temperature are constant, it shows a tendency to decrease the content of the residual monomer.

The hot-air velocity means a velocity of air flowing into the fluidized bed dryer in order to remove moisture from polymer particles containing moisture.

At this time, when the hot-air temperature is maintained at 70° C., the residual monomer content of the polymer can be controlled to 4000 ppm or less within a range of the hot-air velocity of 0.2 to 0.6 m/s.

Also, when the hot-air temperature is maintained at 70° C. and the hot-air mass ratio is 5 to 10 within the range of the hot-air velocity of 0.2 to 0.6 m/s, the residual monomer content of the polymer can be controlled to 3500 ppm or less.

Furthermore, when the hot-air temperature is maintained at 70° C. and the hot-air mass ratio is 10 to 20 within the range of the hot-air velocity of 0.2 to 0.6 m/s, the residual monomer content of the polymer can be controlled to 2500 ppm or less.

In addition, when the hot-air temperature is maintained at 70° C. and the hot-air mass ratio is 20 to 200 within the range of the hot-air velocity of 0.2 to 0.6 m/s, the residual monomer content of the polymer can be controlled to 100 ppm or less.

Thus, when the hot-air temperature and the hot-air velocity are maintained, the residual monomer content can be predicted depending on the hot-air mass ratio.

The polymer capable of controlling the residual monomer content by the method according to the present invention is not particularly limited, but may be, for example, an acrylonitrile butadiene styrene (ABS) copolymer.

Although the fluidized bed dryer has been described as an example until now, the method for controlling the residual monomer content of the polymer as described above can be applied to all cases in which particle systems are dried using a constant temperature and a constant air velocity, such as a hot-air dryer.

MODE FOR INVENTION

Hereinafter, the present application will be described in more detail by way of examples according to the present application and comparative examples that do not comply with the present application, but the scope of the present application is not limited by the examples as set forth below.

Example 1

Measurement of Residual Monomer Contents According to Hot-Air Mass Ratios Under a Specific Hot-Air Temperature Condition In a fluidized bed dryer having a bed section area of 15 cm×15 cm and a bed height of 30 cm, while the hot-air temperature was changed to 70° C., 80° C. and 90° C., respectively, the contents of the residual monomer were measured according to hot-air mass ratios including the current mass-production dryer standard.

The results were shown in FIG. 1 below. Referring to FIG. 1, it can be confirmed that as the hot-air mass ratio increases, the content of the residual monomer decreases.

Example 2

Measurement of Residual Monomer Contents According to Hot-Air Mass Ratios Under a Specific Hot-Air Velocity Condition In the same fluidized bed dryer as that of Example 1, while the hot-air temperature was kept constant at 70° C. and the hot-air velocity was changed to 0.3 m/s and 0.55 m/s, respectively, the contents of the residual monomer were measured according to hot-air mass ratios.

Figure 2:
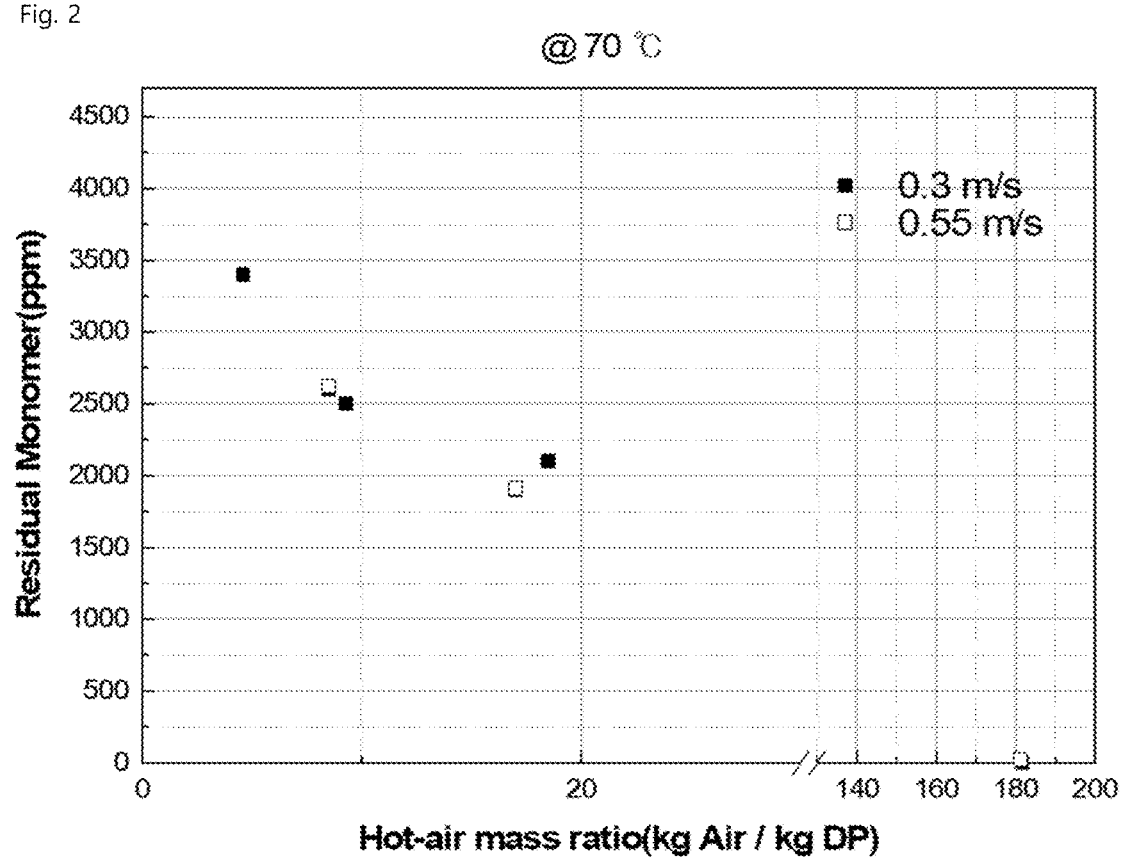
FIG. 2 is a graph showing residual monomer contents depending on hot-air mass ratios under specific hot-air temperature and hot-air velocity conditions.

The results were shown in FIG. 2 below. Referring to FIG. 2, it can be confirmed that as the hot-air mass ratio increases, the content of the residual monomer decreases.

Comparative Example 1

Measurement of Residual Monomer Contents According to Drying Conditions

In a fluidized-bed dryer, while the residence time and the hot-air temperature were changed to 70° C./5 min and 90° C./10 min, respectively, under a superficial velocity condition of 3 m/s on the bed having a section area of 1 m×1 m and a height of 1 m, the contents of the residual monomer were measured. The results were shown in Table 1 below.

TABLE 1

| Hot-air temperature/retention time | Residual monomer (ppm) |
|---|---|
| — | 4,200 |
| 70° C./5 min | 420 |
| 90° C./10 min | 70 |

However, the results in Table 1 were results shown only under the very high superficial velocity condition on the bed having a section area of 1 m×1 m and a height of 1 m, and it was confirmed that these results were not shown under other conditions.

Such results are because the residence time and the superficial velocity, and the like change depending on the polymer inflow rate, the bed size and the physical property difference of the polymer.

That is, it means that regardless of the residence time and the hot-air temperature, when the hot-air is supplied at a very high velocity, a polymer having the very low residual monomer content can be produced.

Thus, it can be seen that such a method makes it difficult to predict the residual monomer content.

INDUSTRIAL APPLICABILITY

The present application is applicable to a residual monomer content controlling method of a polymer.

The invention claimed is:

1. A method for controlling a residual monomer content in a polymer in a drying process using a dryer, comprising:
controlling the residual monomer content to a desired level based on a hot-air mass ratio factor represented by Equation 1 below:

$$A/B \qquad \text{[Formula 1]}$$

wherein, A is a mass (Kg) of hot-air flowing into the dryer, and B is a mass (Kg) of the polymer flowing into the dryer.

2. The residual monomer content controlling method of the polymer according to claim 1,
wherein the residual monomer content in the polymer is controlled without consideration of one or more external factors selected from the group consisting of bed sizes, superficial velocities, hot-air flow rates, retention times and polymer types.

3. The residual monomer content controlling method of the polymer according to claim 1,
wherein as the hot-air mass ratio represented by Equation 1 increases, the content of the residual monomer decreases linearly or non-linearly.

4. The residual monomer content controlling method of the polymer according to claim 1, further comprising:
controlling the residual monomer content based on a hot-air temperature factor.

5. The residual monomer content controlling method of the polymer according to claim 4,
wherein the residual monomer content in the polymer is controlled to 4500 ppm or less by maintaining a hot-air temperature in a range of 60 to 100° C. and a hot-air mass ratio in a range of of 2 to 10.

6. The residual monomer content controlling method of the polymer according to claim 4, further comprising:
controlling the residual monomer content based on a hot-air velocity factor.

7. The residual monomer content controlling method of the polymer according to claim 6,
wherein the residual monomer content in the polymer is controlled to 4000 ppm or less by maintaining a hot-air temperature at 70° C. and a hot-air velocity within a range of 0.2 to 0.6 m/s.

8. The residual monomer content controlling method of the polymer according to claim 1,
wherein the polymer is acrylonitrile butadiene styrene (ABS) copolymer particles.

* * * * *